(12) United States Patent
Narayanaswamy et al.

(10) Patent No.: US 6,224,924 B1
(45) Date of Patent: *May 1, 2001

(54) SHELF STABLE BATTER ARTICLE AND METHOD OF PREPARATION

(75) Inventors: Venkatachalam Narayanaswamy, Maple Grove; Lloyd E Metzger, Champlin; James E Langler, White Bear Lake; David W Tobelmann, Plymouth, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/398,729

(22) Filed: Sep. 17, 1999

(51) Int. Cl.⁷ .............................. A21D 4/00; A21D 13/00; A21D 10/04
(52) U.S. Cl. ........................ 426/128; 426/392; 426/399; 426/410; 426/552; 426/558; 426/561
(58) Field of Search .................................. 426/128, 391, 426/399, 552, 558, 561, 410

(56) References Cited

U.S. PATENT DOCUMENTS

| | | | |
|---|---|---|---|
| 2,982,662 | * 5/1961 | Cochran | 99/192 |
| 3,649,304 | * 3/1972 | Fehr, Jr. et al. | 99/192 |
| 3,862,341 | 1/1975 | Johannes . | |
| 4,353,932 | * 10/1982 | Bone | 426/553 |
| 4,774,099 | 9/1988 | Feeney et al. . | |
| 4,904,493 | 2/1990 | Petrizzeli . | |
| 4,940,595 | 7/1990 | Yasosky et al. . | |
| 5,034,241 | 7/1991 | Keyser et al. . | |
| 5,106,635 | * 4/1992 | McCutchan et al. | 426/107 |
| 5,178,893 | 1/1993 | Seewi et al. . | |
| 5,384,139 | * 1/1995 | Vasseneix | 426/128 |
| 5,409,720 | 4/1995 | Kent et al. . | |
| 5,447,739 | * 9/1995 | Emanuelson et al. | 426/552 |
| 5,514,387 | 5/1996 | Zimmerman et al. . | |
| 6,013,294 | * 1/2000 | Bunke et al. | 426/120 |
| 6,024,997 | 2/2000 | Blaschke . | |
| 6,030,654 | 2/2000 | Thomas et al. . | |
| 6,039,994 | * 3/2000 | LeFlecher et al. | 426/553 |

FOREIGN PATENT DOCUMENTS

0868850  * 10/1998 (EP) .
WO99/04640 * 2/1999 (WO) .

* cited by examiner

*Primary Examiner*—Nina Bhat
(74) *Attorney, Agent, or Firm*—John A. O'Toole; Douglas J. Taylor; Janal M. Kalis

(57) ABSTRACT

A shelf stable ready-to-bake batter article for baked goods comprises an unpressurized gas impermeable container, a high pH, low water activity, batter that is substantially free (less than 0.1%) of conventional $CO_2$ gas producing leavening agents disposed within the container and partially filling the container and an inert low oxygen gas in the headspace not filled by the batter. The ratio of sugar to flour in the batter ranges from about 0.5:1 to 3.5:1. The batter has a water activity of less than 0.85.

23 Claims, No Drawings

SHELF STABLE BATTER ARTICLE AND METHOD OF PREPARATION

FIELD OF THE INVENTION

The present invention relates to packaged food articles and to their methods of preparation. More particularly, the present invention relates to articles comprising a gas-impermeable container and a starch based batter for baked goods that are storage stable at room temperature.

BACKGROUND

Baked goods such as brownies, cakes, cookies, and muffins are popular consumer snack food and dessert food items. A wide variety of recipes are currently available for use by consumers to prepare small quantities of baked goods from various ingredients.

For greater convenience and shelf stability, dry mixes for baked goods have long been available. The consumer mixes the dry mix with liquid ingredients such as water, milk, oil and/or eggs to form a batter. The batter is then immediately poured into a baking pan and baked to form the finished baked goods.

Useful developments in the formulation of dry mixes for baked goods continue to be made. For example, an improved dry mix for brownies is disclosed in U.S. Ser. No. 08/929,827 filed Sep. 15, 1997 by Palmer et al entitled "Dry Mix for Baked Goods with Gellan Gum and Method of Preparation" (which is incorporated herein by reference). The dry mixes for brownies disclosed therein include gellan gum in addition to other ingredients. The dry mixes not only are useful for preparing low fat, high quality finished baked goods by consumers for home use, but also can be used for the large scale production of finished baked goods suitable for refrigerated sales and distribution. While the formulation for the dry mix is improved, the dry mixes are packaged in a conventional manner in a sealed bag placed in a conventional carton.

While dry mixes for home use are convenient, current trends for consumer package food products favor products of even greater convenience. The present invention provides improved products of greater convenience. The present invention provides articles comprising ready-to-bake batters that are shelf stable and can be stored at room temperatures for extended periods of time.

Refrigerated ready-to-bake batters having relatively short shelf lives are also known. One concern with such products is bacterial growth. A second problem resides in providing a leavening system that retains functionality over extended storage. Acidifying the batter desirably extends bacterial stability. However, the acidity undesirably tends to interact with the leavening system. With poor leavening, the finished baked goods exhibit undesirable volume and poor texture.

The present invention provides ready-to-bake batters for finished baked goods that are stable even at room temperature. The present articles thus provide the benefits combination of shelf stability of conventional dry mixes with the greater convenience of ready-to-bake batters.

Shelf stable batters for finished baked articles are commercially available, for example, in France made as described in EP 868,850 A published Oct. 7, 1998. Such articles comprise an impermeable flexible membrane pouch containing a batter comprising a $CO_2$ gas producing leavening system and an inert gas atmosphere.

The present invention resides in part in the surprising discovery that a $CO_2$ gas producing leavening agent is not an essential ingredient in the present packaged ready-to-bake batters.

The present invention provides improvements in those articles described in U.S. Ser. No. 09/322,208 (filed May 28, 1999) entitled "Shelf Stable Brownie Batter Article and Method of Preparation" which is incorporated herein by reference. The improvement resides in important part in the surprising discovery that expanded finished baked goods such as layer cakes, quick breads, muffins, pancakes, etc, can be provided from shelf stable batters articles even though such batter articles are substantially free of conventional $CO_2$ gas producing leavening agents.

SUMMARY OF THE INVENTION

In its product aspect, the present invention resides in shelf stable ready-to-bake batter articles that provide improved finished baked goods but do not require refrigeration. The articles comprise an unpressurized gas impermeable container, a neutral pH, low water activity, batter that is substantially free of conventional $CO_2$ gas producing leavening agents disposed within the container and an inert low oxygen gas or gases in the headspace not filled by the batter.

The batter essentially comprises sugar, flour, water and the balance of conventional batter ingredients such as starches, flavors (e.g., chocolate), egg or egg solids, fat, humectants, gums, salt, etc. The sugar to flour ratio ranges from 2.5:1 to about 0.5:1. The water activity is less than 0.85. The pH ranges from about 6.0 to 8.0. The headspace inert gas has an oxygen content of less than 4%, preferably less than 2%. $N_2O$ essentially comprises at least a portion of the headspace inert gas. The batter is substantially free of conventional $CO_2$ gas producing leavening agents. The batter has incorporated therein sufficient amounts of $N_2O$ gas to provide a batter having a density of about 0.7 to 1.1 g/cc.

In its process aspect, the present invention is directed to processes for making a ready-to-bake batter article that is shelf stable at room temperature. The process comprising the steps of:

providing an open sealable, gas impermeable container;
dispensing a farinaceous batter within at least a portion of the container, said farinaceous batter comprising:
about 20 to 70% sugar
about 10 to 40% flour
about 0 to 5% egg solids
about 0.1 to 3% salt
about 0 to 4% emulsifiers
about 0 to 25.1% fat
about 5 to 30% moisture
said batter having a sugar to flour ratio of about 2.5:1 to 0.5:1
a water activity of less than 0.85
a pH of about 6 to 8.0;
said batter being substantially free of any conventional $CO_2$ gas producing leavening agents, and
said batter having sufficient amounts of $N_2O$ to provide the batter having a density of about 0.7 to 1.0 g/cc;
filling the headspace portion of the container that is unfilled with the batter with an inert gas having an oxygen content of less then 4% at least a portion of which is $N_2O$;
sealing the container the form a shelf stable ready-to-use batter article.

DETAILED DESCRIPTION OF THE PREFERRED EMBODIMENT

The present invention relates to packaged ready-to-bake batters for baked goods characterized by shelf stability at room temperature and to their methods of preparation and use. Each of the product components as well as product use and attributes and methods of their preparation are described in detail below.

Throughout the specification and claims, percentages are by weight and temperatures in degrees Fahrenheit unless otherwise indicated.

The present articles or products essentially comprise a gas impermeable container; a low water activity $N_2O$ containing batter disposed within and partially filling the container; and an unpressurized, inert low oxygen gas in the unfilled headspace.

The container can be flexible or rigid or semi rigid and of any suitable shape or configuration.

For example, suitable for use for the gas impermeable container are widely available pouches fabricated from flexible laminate materials having low gas permeability. A suitable laminate is a polyester-aluminum-polyester laminate. Also useful are tubs fabricated from plastic, glass or metal. In other variations, the container or portions thereof can serve as a disposable baking container. For example, the container can comprise an aluminum or an ovenable plastic baking tray or tub having an overlaying peelable gas impermeable foil membrane. Having the container function as the baking container adds further convenience by eliminating transfer of the batter from the container to the baking utensil.

The articles further essentially include a ready-to-bake or use batter disposed within the container. The batters essentially comprise sugar, flour, fat, and moisture and sufficient amounts of $N_2O$ to provide a batter having a density of about 0.7 to 1.0 g/cc.

Batters and doughs are distinguishable compositions even though each comprises some number of common ingredients.

"Dough" as used herein refers to an intermediate food product that has a gluten based structure. In dough, the gluten forms a continuous dough elastic medium into which other ingredients are embedded. A dough is typically prepared by beating, blending, cutting or kneading and is often stiff enough to cut into various shapes. Doughs generally are used for low sugar to flour ratio products such as breads, biscuits, etc.

In contrast, "Batter" as used herein refers to an intermediate food product that essentially contains flour, water, and salt and optionally fat, eggs, and sugar(s) that are a starch batter based composition. In a batter, gluten development is purposefully minimized. Batters are inelastic. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour or scoop or squeeze out of a container.

Flour

The present batter compositions essentially contain from about 10 to 40% of the batter of flour. Conventionally, flour is standardized to about 14% moisture. Flour(s) useful herein can be of conventional type and quality including cake flour, bread flour and all-purpose flour. Wheat flours are preferred but other flours conventionally used in the preparation of baked goods can also be employed in full or partial substitution for the wheat flour. Traditional cake flour used for layer cakes has about 8% or less protein by weight of the flour. Pastry flour ordinarily has a protein level of about 10%. Other flours such as bread flour generally have higher protein levels of about 11 to 13% by weight. The preferred protein range for the wheat flour useful in this invention is between about 7 to 10% by weight of the flour. An all-purpose flour also can be used. Such all-purpose flour generally comprises a mixture of both hard and soft wheat flours, i.e., both high protein level and low protein level flours. Such flours are useful if the average protein content ranges from about 7 to 10% by weight.

Both chlorinated or unchlorinated flours can be used depending on the application. However, malted flours that are typically used for bread making should be avoided. Unmalted flours selected for use herein should be of high quality and desirably are from wheats with minimal sprout damage. Enzyme inactivated flours can also be used.

Sugar

The batter compositions of the present invention also essentially comprise from about 20 to 70% of the batter of a sugar or nutritive carbohydrate sweetener ingredient. Typically, sucrose is used in mixes for baked goods as the sugar ingredient. The use of reducing sugars such as dextrose, fructose, maltose, lactose, etc. is limited because of their ability to cause brown coloration of the batter via non-enzymatic browning. Commercially available milled sugar can be used and some applications can require sugar of a particular grind.

Sugar to Flour Ratio

The baker's ratio is the weight ratio of sugar to flour. The baker's ratio is used to provide desired baked good attributes. The baker's ratio of the baked goods batters herein can range from about 0.5:1 to 2.5:1, that is from about ½ part sugar to one part flour to about 2½ parts sugar to one part flour. Preferably, the sugar to flour ratio of the present batters range from about 0.5:1 to 2.0:1. Maintenance of the sugar to flour ratio within the range is important to providing finished baked goods having the desired eating qualities. The sugar-to-flour ratio is also important to obtaining the desired shelf storage at room temperature benefit provided by the present improved articles.

Fat Component

The present batter or dough compositions can also comprise from about 0 to 25% of an edible fat or shortening ingredient, preferably about 10% to 20%. A shortening component adds richness to the eating properties of the finished baked goods. The particular fat constituent level will depend particularly upon the desired type of finished baked good desired and its properties.

Maintenance of shortening concentrations within these limits is important for providing baked goods of acceptable textural quality. Surprisingly, the fat constituent provides a solute into which $N_2O$ gas dissolves as described in detail below. Conventional shortening materials are suitable for use as the shortening ingredient of the present batters. Such conventional shortening materials are well known in the baked goods art. The conventional shortenings useful herein are fatty glyceridic materials that can be classified on the basis of their physical state at room temperature. Liquid shortenings or oils can be used and provide the advantage of ease of incorporation. Solid shortening can also be used and provides the advantage of desirable mouth feel upon consumption. More commonly, and preferred for use herein, are mixtures of liquid and solid shortenings. Such mixes can be fluid or plastic depending in part upon the level of solid fatty materials. Shortenings of this type comprise liquid oil containing from about 2 to 26% normally solid fatty glycerides. That is, solids fat index ("SFI") at 70° and 4% to 6% at 100° F.

The solid fatty glycerides can include fatty monoglycerides and diglycerides of saturated fatty acids having 16 to 22 carbon atoms. The liquid shortening can be animal, vegetable or synthetic oil (e.g., sucrose polyesters) which is liquid at ordinary room temperatures. Representative of such liquid shortenings are coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil and the like. Other suitable shortening materials and methods of shortening preparation are described in detail in Bailey, "Industrial Oil and Fat Products," (3rd ed. 1964) which is incorporated herein by reference.

Mixtures of the above oils can also be used herein as can solid fatty materials, such as saturated triglyceride fats. In general, from about 1.5 to 25% of triglycerides that are solid at 70° F. can be added to liquid oil.

The present batters further essentially comprise about 1 to 4% of emulsifier(s), preferably about 1 to 3%. The shortening provides a convenient carrier for addition of emulsifiers to the batter. Such emulsifiers aid the realization of baked goods with improved grain structure and texture. The emulsifier is also useful to maintain the emulsion integrity of the batter over extended room temperature storage.

All or a portion of the emulsifier(s) component can be admixed with the shortening component. The emulsifier typically comprises from about 1 to 20% of the shortening component, preferably from about 5 to 15% and, most preferably from about 10 to 15%.

Emulsifiers may be prehydrated in an aqueous dispersion and added to the batter or dough. They can also be part of an emulsion or dispersion with or without a fat component. Generally useful as the emulsifiers are partially esterified polyhydric compounds having surface-active properties. This class of emulsifiers includes among others, mono- and diglycerides of fatty acids, such as monopalmitin, monostearin, monoolein, and dipalmitin; partial fatty esters of glycols, such as propylene glycol monostearate and monobehenate; higher fatty acid esters of sugars, such as the partial palmitic and oleic acid esters of sucrose; and phosphoric and sulfuric acid esters, such as dodecyl-glyceryl ether sulfate and monostearin phosphate. Other examples include the partial esters of hydroxycarboxylic acids, such as lactic, citric, and tartaric acids with polyhydric compounds, for example, glycerol lacto-palmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful.

Moisture

The present batters have total moisture content of 5% and about 25% moisture. The total moisture includes water provided with or associated with the various essential and optional ingredients. For example, total moisture includes the moisture associated with flour, starch, cocoa and especially liquid eggs. The total moisture can be easily determined by vacuum oven drying of the batters herein. In some embodiments, no added water is employed to formulate the present batters. Rather, only pasteurized liquid eggs provide moisture and the residual moisture associated with the dry ingredients. While in other embodiments dry egg solids are added, water is added to the batter or dough as part of an emulsion or dispersion containing other active ingredients such as emulsifiers, polyols, etc.

The particular selection of ingredients and concentration are selected to provide batters having a water activity of less than 0.85 and for best results less than 0.85 to about 0.55. Selection of such water activity value is important to achieving a balance between microbial shelf stability and batter handling characteristics.

The present batters are preferably not acidified and thus range in pH from about 6.0 to 8.0. The batters herein are preferably essentially free of conventional leavening acids. The combination of low oxygen gas in the headspace and a low water activity is sufficient to maintain shelf stability at room temperature.

If desired, the batters can further comprise about 1 to 8% of a humectant, preferably about 1% to 6%. Humectant addition is helpful to achieving the present essential water activity level and the microbial shelf stability at room temperature provided by the present articles. The humectant can be any commonly employed humectant ingredient. Preferred humectants are selected from the group consisting of sorbitol, xylitol, manitol, glycerin, glycerol, propylene glycol and mixtures thereof. Preferred for use herein is a mixture of sorbitol and glycerin or glycerin by itself.

In highly preferred embodiments, the present articles further comprise an anti-mycotic ingredient such as sodium, potassium sorbate, calcium propionate, or parabens. While not needed to maintain shelf stability, addition of such antimycotic ingredients is desired from a food quality standpoint in case the physical integrity of the article is comprised and oxygen leaks into the headspace. Preferred for use herein is methyl or proply or combination thereof not exceeding 0.1% total.

While the invention is specifically described in terms of improved baked goods, such as layer cakes, muffins, quick breads, cupcakes, biscuits, corn bread, the batters can be used for or formulated for use to prepare other cooked farinaceous goods within the scope of this invention including griddle cakes such as pancakes, crepes or cornbread, Irish soda bread or waffles. Also, while the present articles are especially suited for use for preparing leavened finished goods, other finished goods can also be prepared therefrom.

Batters for chocolate brownies or chocolate (e.g., "Devil's Food") cake are preferred herein and generally comprise about 2 to 12% cocoa, preferably about 5 to 10%.

The cocoa used in this invention is either natural or "Dutched" chocolate from which a substantial portion of the fat or cocoa butter has been expressed or removed by solvent extraction, by pressing, or by other means. Cocoa suitable for use in the process of this invention may contain from 1 to 30% fatty constituents.

Dutched chocolate is prepared by treating cocoa nibs with an alkali material such as potassium carbonate in a manner well known in the art. Generally, it tends to have a darker color and also can be more flavorful than natural cocoas.

Chocolate can be used in practicing the process of this invention and it is intended, therefore, that chocolate, as described above, to be encompassed by the term "cocoa". When chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

It is a remarkably surprising advantage of the present invention that the present batters do not require a conventional soda $CO_2$ generating chemical leavening system. In general, such chemical leavening systems are composed of a baking soda, e.g., sodium, potassium, or ammonium bicarbonate, etc., as a source of carbon dioxide on one hand, and one or more other common baking acids on the other. Maintaining the functionality of a chemical leavening system over time in a batter generally requires careful and expensive encapsulation of the acid, the soda, or both. Eliminating this expensive and problem ridden encapsulation reduces both the cost and complexity of the batter as well as increasing the reliability of the present articles for the consumer.

Certain formulation of products such as brownies can additionally comprise about 0.01 to about 0.2% gellan gum. For best results, the gellan gum can comprise about 0.015 to 0.12% of the batter.

Gellan gum is a heteropolysaccharide prepared by fermentation of Pseudomonas elodea ATCC 31461. Gellan gum is available from Kelco Division of Merck & Co., Inc., San Diego, Calif., under various names, including KELCOGEL, KELCOGEL IF, KELCOGEL PC, and KELCOGEL F. Processes for preparing gellan gum include those described in U.S. Pat. Nos. 4,326,052 and 4,326,053.

In preferred embodiments, gellan gum is the sole hydrophilic colloid. In other embodiments, however, the batter can additionally include conventional gum ingredients in addition to the gellan gum component.

If desired, the present batters can additionally comprise about 0.02 to 2% of a supplemental gum member selected from the group consisting of guar, xanthan, locust bean, carboxymethyl cellulose or others and mixtures thereof.

When gellan gum or other calcium setting hydrophilic colloids are added to the batters, the batter can further beneficially comprise about 10 to 50 PPM soluble calcium. Calcium chloride or other calcium can provide the calcium salts.

Still another useful optional ingredient is starch. Starch addition can be used to influence a variety of product attributes including viscosity, finished baked goods' volume and texture. The starch used can be any of the common food starches, for example, potato starch, corn starch, wheat starch, rice starch, barley starch, oat starch, tapioca starch, arrowroot, and sago starch. Modified starches and pregelatinized starches can also be used. If present, the added starch ingredient(s) can comprise about 0.1 to 10%, preferably about 1 to 8% of the batter.

The present compositions can optionally contain a variety of additional minor ingredients or "conventional additives" suitable for rendering finished baked goods prepared therefrom more organoleptically desirable. Such optional dry mix components include anti-oxidants, flavor/coloring agents, salt, coloring agents, flavoring agents, flavor chips, nuts and fruit pieces, or other edible inclusions. Flavor chips include chocolate, mint chocolate, butterscotch, peanut butter chips and mixtures thereof. The flavor chips can be coated with topical film to minimize moisture immigration such as with a hard fat or with edible shellac. If present, such optional components collectively comprise from about 1 to 25% of the batter of the present invention.

Another highly preferred optional ingredient in the present batters is nonfat dry milk solids. Nonfat dry milk solids aid the structuring of the finished baked good. If present, such dry milk solids can comprise from about 0.5 to 2.0% of the present batters.

The batters further essentially comprise sufficient amounts of $N_2O$ to provide a batter having a density of about 0.7 to 1.1 g/cc, preferably about 0.75 to 0.1.0 g/cc. Generally, prior to admixture of the $N_2O$ as described further below, the batters have densities ranging generally between about 0.9 to 1.25 g/cc. Surprisingly, admixture of $N_2O$ into the batter in sufficient amounts can function as a leavening agent to provide leavened finished baked goods. A portion of the $N_2O$ is dissolved in the batter while a portion is physically entrapped. This entrapped gas in the batter provides the leavening action during baking and a desirable end product texture is achieve without chemical leavening agents.

In more preferred embodiments, the $N_2O$ alone functions to provide the leavening action. In these preferred embodiments, the batters are further defined as being essentially free (i.e., containing less than 0.5 wt. %) of conventional $CO_2$ generating ingredients such as conventional soda constituents. By eliminating the presence of such $CO_2$ generating ingredients, the undesirable interaction between the acidic ingredients and soda ingredients is avoided. Premature generation of $CO_2$ is avoided (such as during extended room temperature storage). Such minimization is especially desirable when the present batters are packaged in gas impermeable containers. Such premature $CO_2$ generation can lead to undesirable package pressurization and possible rupture. Thus, an advantage of the present invention is the provision of a leavened batter that exhibits minimal leavening degradation over time. An additional advantage is that the desired initial batter pH can be maintained during extended storage.

The present articles further essentially comprise an initial inert gas in the headspace of the container not occupied by the batter, e.g. $N_2$, $CO_2$, $N_2O$, and mixtures thereof. The residual oxygen content is less than 4%, preferably less than 2% and for best results less than 1%. In highly preferred embodiments the headspace gas essentially comprises $N_2O$ in the present invention, a large amount of $N_2O$ is added to the batter to create a low-density batter "aerated" with $N_2O$. This large amount of $N_2O$ can act as the sole leavening ingredient. Addition of $N_2O$ also to the headspace facilitates equilibrium between the headspace and the batter.

In preferred embodiments, the headspace comprises at east 10% (v/v) of $CO_2$, preferably at least 20%. At such levels, the $CO_2$ provides modest preservative properties against spoilage.

METHOD OF PREPARATION

The batters of the present invention are prepared by blending the essential and optional components together in such a manner as to produce a well blended, low density $N_2O$ containing batter having densities ranging from about 0.7 to 1.1 g/cc.

In a preferred method of preparation, a preblend of the dry ingredients other than the gellan or other gums is made. If employed oil or shortening is melted to form a liquid. A portion of the water is used to prehydrate the gums and a portion to prehydrate the emulsifiers. Thereafter, the liquid ingredients are combined to form a wet mixture. The wet mixture and dry preblend are then combined under anaerobic conditions to form a batter. The batter can, for example, be prepared in a batch or a continuous mixing device adapted to add gas. A composition may have more than one liquid mixture.

The $N_2O$ can be admixed with the batter to form a low-density batter in any convenient manner. For example, the admixture step can conveniently be practiced using a twin screw extruder equipped with gas injection means. The dry ingredients and wet ingredients are added to the twin screw extruder to form a batter. At a later stage of the extruder, $N_2O$ gas is injected and mixed in the extruder with the batter to incorporate sufficient amounts of the $N_2O$ to form the low density $N_2O$ containing batter. An advantage of using a twin screw extruder is that a single piece of equipment is used to prepare the batter and incorporate the $N_2O$ to form the low-density batter.

Another method is to prepare a high density batter (e.g., 1.10 to 1.25 g/cc) using conventional batter preparation mixers and techniques. Thereafter, in a separate substep or piece of equipment, $N_2O$ is admixed with the high-density batter to form the present low-density batter. For example, a well-known "Goodway" mixer e.g., A Goodway CM-6 continuous mixer can be used to practice the incorporation step. A "Goodway" mixer is often used in the aerated confection industry to aerate confection slurry to form aerated foam. The CM-6 continuous mixer/foamer manufactured by Goodway Sales, Inc., 175 Orville Drive, Bohemia, N.Y. consists of mixing chamber fed by a positive displacement pump and air flow system. Product flow is controlled by pump speed adjustment and air flow is controlled by flowmeter adjustment. Variable speed motors with ten turn controls power the mixer and pump drives. Stainless steel concentric rows of intermeshing teeth on two stators and one rotor produce a uniformity and consistency in the mix.

The high-density batter is fed to the Goodway mixer. An $N_2O$ supply feeds the mixer. After incorporation, a low density $N_2O$ containing batter is formed.

Other well-known apparatus and techniques (e.g. whippers or aerators) can be used to practice the $N_2O$ incorporation into the batter step, e.g., an "Oakes" whipper (used in the confection art).

The incorporation of $N_2O$ herein is to be distinguished from merely flushing of $O_2$ with $N_2O$ as known in the art, even when several flushing cycles are practiced. Such mere flushing of $O_2$ with $N_2O$ does not result in a low-density batter as in the present invention.

Desired quantities of the low density $N_2O$ containing batters are then charged to or are otherwise disposed within the container to partially fill the container. The batter filled container is then flushed or charged with inert gas or gas blends to insure low oxygen atmosphere in any unfilled headspace. The containers are then sealed to form the finished ready-to-use container articles.

The temperature of batter during filling step can be at room to warm temperatures, e.g., 70 to 100° F. (21.1 to 37.7° C.).

The packaged ready-to-bake baked goods batter articles herein do not require heat treatment such as pasteurization or refrigeration in order to obtain shelf stability notwithstanding having a relatively high pH. The products enjoy microbial stability and retain their good baking properties for as long as four to nine months at room temperature storage.

The articles so prepared enjoy extended shelf stability at room temperature and do not require refrigerated storage.

The articles are packaged to be substantially unpressurized, i.e. can be packaged at atmospheric pressure.

The present batters are conveniently prepared into finished baked goods by simple addition to a suitable baking container or pan and baking to form a finished brownies baked good is charged into a baking container and baked for sufficient times, for example, at 160° to 218.3° C. (325 to 425° F.) for about 10 to 40 minutes to form a finished baked good.

Baking time depends on the thickness of the batter in the pan, with a longer bake time required for a thicker (higher) batter. Bake times range between about 10 to 45 minutes. The resultant finished baked goods are characterized by a highly moist but not sticky or tacky texture. The finished baked goods are further characterized by being expanded or leavened and typically have densities ranging from about 0.3 to 0.6 g/cc. The finished baked goods are ready for immediate consumption or can be prepared on a commercial scale for distribution.

While the present invention finds particular suitability for use in connection with baked items such as brownies, layer cakes, quick breads, coffee cakes, muffins, in another variation, the batters can be used to prepare skillet items such as pan cakes, crepes or items such as waffles.

Also, while the present articles do not require refrigeration, the articles can be cooled and stored at refrigeration temperatures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes, which come within the meaning and range of equivalency of the claims, are intended to be embraced therein.

What is claimed is:

1. A ready-to-use batter article especially useful for baked goods, comprising:
    an essentially gas-impermeable container;
    a batter disposed within the container, comprising:
        flour, sugar, moisture and salt, said batter having
        a sugar to flour ratio of about 0.5:1 to about 2.5:1,
        a moisture content of about 5 to 25.1%, and
        a water activity of less than 0.85;
        a pH of about 6 to 8.0;
        said batter being substantially free of any conventional $CO_2$ gas producing leavening agents and said batter comprising sufficient amounts of $N_2O$ to provide the batter having a density of about 0.7 to 1.1 g/cc;
    an inert gas disposed within the container containing less than 4% residual oxygen.
2. The batter article of claim wherein the batter being substantially free of any conventional $CO_2$ gas producing leavening agents.
3. The batter article of claim 1 additionally comprising 0% to 25% fat.
4. The batter article of claim 3 wherein inert gas comprises at least 10% $CO_2$.
5. The batter article of claim 1 shelf stable at room temperature for at least four months.
6. The batter article of claim 4 wherein the inert gas includes $N_2O$.
7. The batter article of claim 1 wherein the batter has a density between 0.7 to 1.1 g/ml.
8. The batter article of claim wherein the container comprises a flexible pouch.
9. The batter article of claim 1 wherein the batter additionally comprises about 1 to 10% cocoa.
10. The batter article of claim 8 wherein the batter additionally comprises about 1% to 8% of a humectant.
11. The batter article of claim 1 wherein the batter additionally comprises about 0.01 to 0.2% gellan gum.
12. The batter article of claim 8 wherein the humectant comprises glycerol or sorbital or a mixture thereof.

13. The batter article of claim 9 wherein the batter additionally comprises about 5 to 200 ppm calcium ions.

14. The batter article of claim 11 wherein the batter additionally comprises about 1 to 5% eggs (dry weight basis).

15. The batter article of claim 11 wherein the batter additionally comprises about 0.1 to 4% emulsifiers, additionally contain sodium, potassium sorbate, benzoate, propionic acid, calcium propionate, or parabens.

16. A method of fabricating a ready-to-bake article, comprising the steps of:

provided an open sealable, gas impermeable container;

dispensing a batter within at least a portion of the container, said baked goods comprising:
about 25 to 70% sugar
about 10 to 40% flour
about 0 to 4% egg solids
about 0.1 to 3% salt
about 0 to 4% emulsifiers
about 0 to 25% fat
about 5 to 30% moisture
said batter having a sugar to flour ratio of about 1.5:1 to 2.5:1
a water activity of less than 0.85
a pH of about 6 to 8.0;

filling the headspace portion of the container that is unfilled with the batter with an inert gas having an oxygen content of less then 4%;

sealing the container for form a shelf stable ready-to-bake batter article.

17. The method of claim 16 wherein the container is fabricated from a flexible material.

18. The method of claim 17 wherein the inert gas in the headspace has an oxygen content of less than 2%.

19. The method of claim 18 wherein the inert gas in the headspace comprises $N_2O$.

20. The method of claim 19 wherein the batter has an oxygen content of less than 2%.

21. The method of claim 20 wherein all the moisture is supplied by pasteurized eggs.

22. The method of claim 19 wherein at least some of the moisture is supplied by pasteurized eggs.

23. The method of claim 19 wherein none of the moisture is supplied by pasteurized eggs.

* * * * *